FIG:5
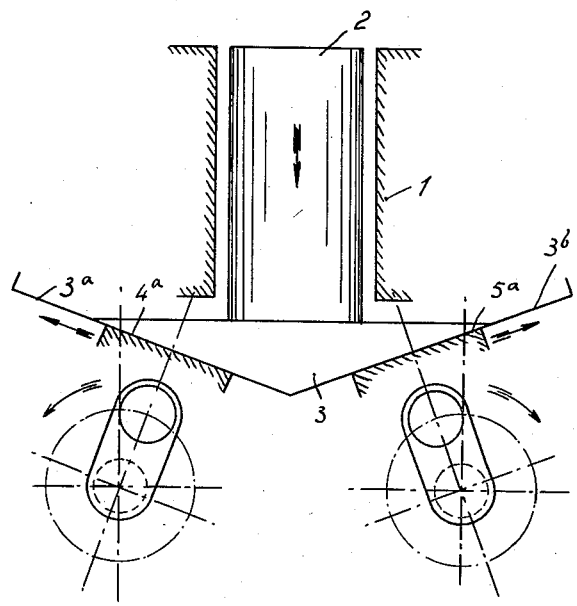
FIG:6
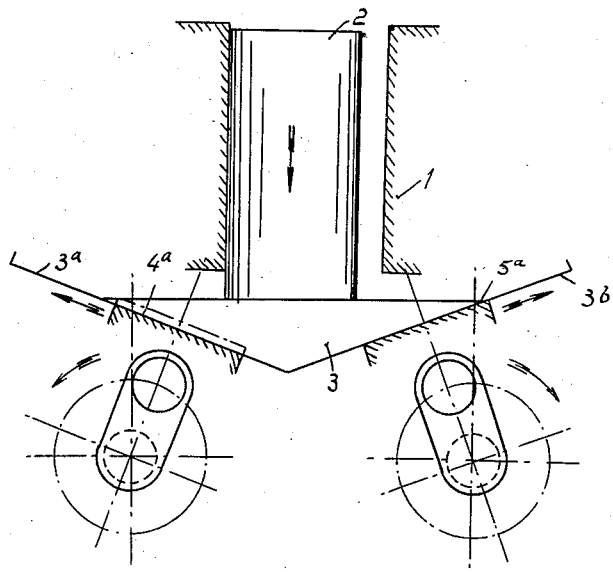
Inventor:
Jacques François Felies
Attorney Patented Aug. 11, 1936

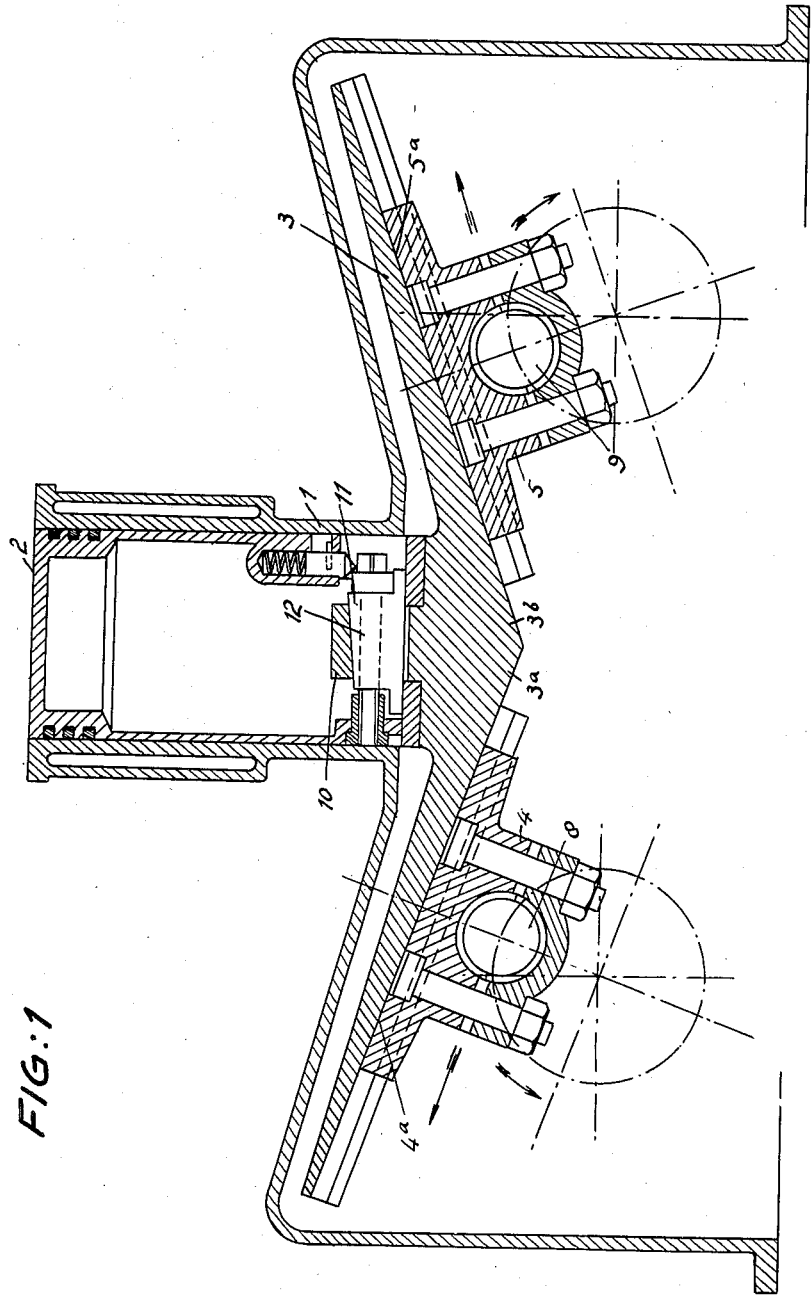

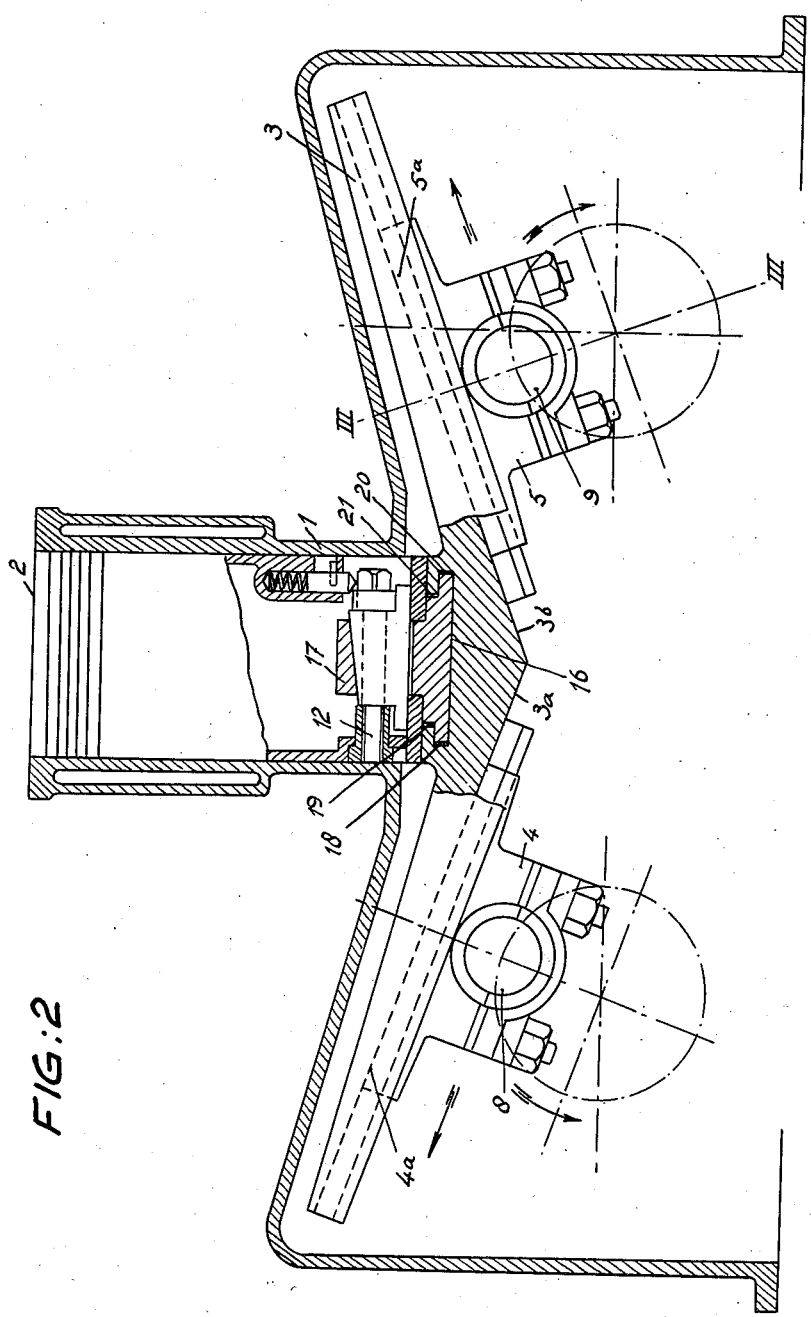

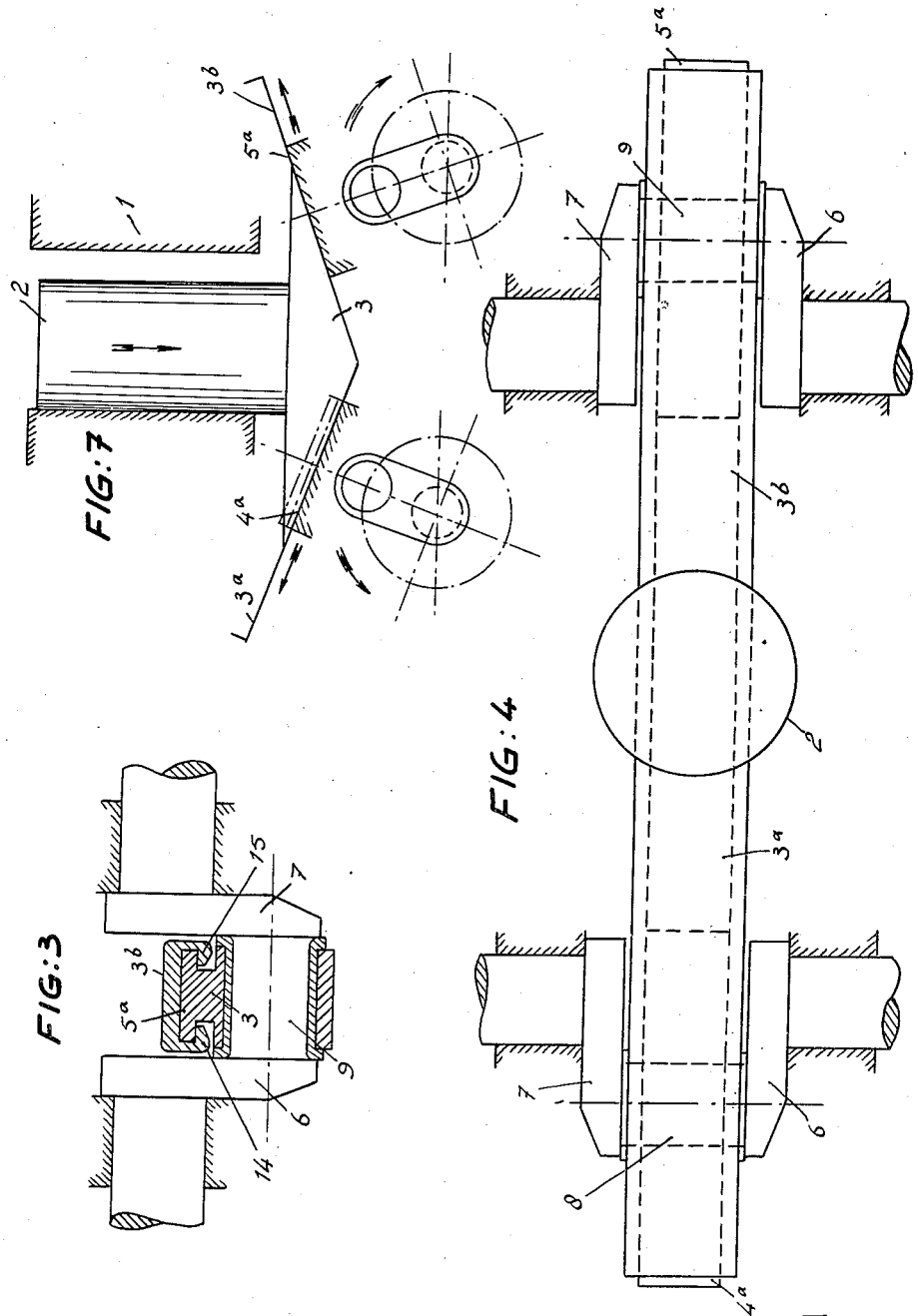

2,050,651

UNITED STATES PATENT OFFICE 2,050,651

PIN-AND-SLOT DRIVING MECHANISM

Jacques François Felies, Antwerp, Belgium

Application November 19, 1934, Serial No. 753,779
In the Netherlands November 21, 1933

7 Claims. (Cl. 74—50)

The invention relates to a pin-and-slot driving mechanism for converting a reciprocating piston motion into a rotating motion of a crank shaft or conversely, particularly for use with internal combustion engines, with a guide body actuated by the piston and of which the friction surface occupies an inclined position with regard to the direction of movement of the piston. The invention consists in that the guide body is made such that two crank pin blocks cooperating with the guide body are moved at an angle with regard to each other.

The purpose of the invention is the construction of a pin- and slot engine in which the axis of the piston always maintains the same direction perpendicular to the cross-section of the cylinder, even when one crank pin block friction surface would wear differently from the other crank pin block friction surface. If the friction surface of the guide body is rectilinear and, therefore, the friction surfaces of the crank pin blocks form together a straight angle, unequal wear of one crank pin block with regard to the other crank pin block will result in a tilting motion, so that the piston axis forms an angle with the cylinder axis, on account of which the piston cuts grooves in the cylinder walls.

In order to still better secure a permanent exact position of the piston axis with regard to the cylinder axis, the guide body according to the invention can be made such that the guide body in itself is able to slide in its longitudinal direction with regard to the cylinder axis.

Two preferred embodiments of the invention are shown in the accompanying drawings, in which the invention is applied to a combustion engine.

Figure 1 shows a vertical section of the first embodiment along the axis of the cylinder and longitudinally to the guide body, the piston being in its upper position.

Figure 2 is a vertical section of the second embodiment along the axis of the cylinder with partial view of the guide body.

Figure 3 is a section along the line III—III of Figure 2.

Figure 4 is a plan view of Fig. 1 without the cylinder block and in which for the sake of clearness the cranks are shown in their outer end position.

Figure 5 is a diagrammatical view showing the position of the piston when the crank pin blocks are not worn.

Figure 6 is a diagrammatical view showing what happens if the friction surface of one crank pin block has worn more than the friction surface of the other crank pin block, the wear for sake of clearness being represented on an abnormally great scale (see the mixed lines).

Figure 7 shows diagrammatically the situation after the guide body has shifted in its longitudinal direction with regard to the cylinder axis, in case the wear of one of the crank pin blocks has become still greater (see the two mixed lines).

In the figures the cylinder block is indicated by 1, the piston by 2, the guide body by 3, the guide body friction surface by 3a, 3b, the crank pin blocks by 4 and 5, the crank pin block friction surfaces by 4a and 5a, the crank webs of each crank by 6 and 7 and the crank pins by 8 and 9.

As appears from Figures 1 and 2, the friction surface of the guide body is in the form of a V.

In its middle the guide body is provided with an extension 10, which extends through a recess in the piston bottom. The guide body is attached against the lower side of the piston by means of a key 11 which extends through an opening of the extension 10 and is fixed by means of a locked bolt 12.

The guide body 3 is provided at both of its longitudinal edges with L-shaped ribs 14 and 15 (Fig. 3), which engage grooves arranged on both sides of the blocks.

The two crank pin blocks are, therefore, slidably connected with the guide body in such a manner that the friction surfaces of the crank pin blocks and those of the guide body are held against each other.

The crank pin blocks always move in opposite direction with regard to each other, so that the cranks also rotate in opposite direction with regard to each other.

In the embodiment according to Figure 2, the guide body is provided in its middle with a recess 16 in which a steel block 17 fits, however in such a manner that on both sides considerable play exists in the longitudinal direction of the guide body. This play is denoted by 18, 19, 20, and 21. The guide body, therefore, is suspended from this block, which like the extension 10 in Figure 1, is clamped against the lower side of the piston by means of a key 11. It does not matter in which manner the guide body is suspended from the piston body if only the guide body in itself is able to slide with regard to the piston axis in the longitudinal direction.

Figure 6 shows clearly in which manner the piston moves with regard to the cylinder axis, i. e. in the direction of the cylinder wall, if the friction surface of one crank pin block wears more than the friction surface of the other block, while at the same time the piston together with the guide body descends a little in such a manner that the friction surface of the guide body always remains in contact with the friction surfaces of the crank pin blocks. It also appears that with this displacement of the guide body in its longitudinal direction and somewhat downwards the axis of the piston always remains parallel to the axis of the cylinder which would not be the case if the friction surfaces of the crank pin blocks would form a straight angle with regard to each other, because in this case the piston would tilt and assume an inclined position with regard to the cylinder axis, if the friction surfaces did not wear equally.

It is evident, that the play between piston and cylinder wall is shown on a much enlarged scale, because in reality the play is very small.

The foregoing does not only apply to the construction according to Figure 1, but also for that according to Figure 2. In this latter embodiment (see Figure 7) however, also the guide body in itself can move in its longitudinal direction with regard to the piston axis, e. g. when the play between the piston and the cylinder wall is practically removed by the displacement of the piston. In this case only the guide body performs a sliding motion in such a manner that the frictional engagement between the friction surface of the guide body and the friction surfaces of the crank pin block are maintained.

It is evident that when the piston is made of two or more parts, one part of the piston may be slidable laterally with regard to the other part, i. e. perpendicularly on the cylinder axis, in which case this further displacement of the guide body is accompanied by a sliding motion of one part of the piston with regard to the other part.

In practice when the friction surface of one crank pin block wears more than the friction surface of the other crank pin block, not only the piston will move laterally, but at the same time the guide body will be displaced laterally with regard to the piston axis. This will depend thereon which friction is greater, that of the piston rings within the grooves of the piston, or the friction of the guide body with regard to the steel block 17.

What I claim is:—

1. Pin-and-slot mechanism for converting a reciprocating piston motion into a rotating motion or conversely, comprising a piston, two crank shafts rotating in opposite directions with regard to each other, a guide body actuated by the piston, crank pin blocks on the crank pins of said two crank shafts and slidably mounted on said guide body, the surface of the guide body on which said blocks are slidably mounted having a V form such that the crank pin blocks cooperating with said friction surface are moved at an angle relative to each other.

2. Pin-and-slot mechanism according to claim 1, in which the guide body is made such that the body in itself can slide transversely in a plane at right angles to the crank shafts.

3. Pin-and-slot mechanism according to claim 1, in which the guide body is suspended slidably transversely in a plane at right angles to the crank shafts from a member which is attached to the piston or forms part of the piston.

4. A mechanical movement for transforming reciprocatory motion into rotary motion, comprising a pair of parallel crank shafts adapted to rotate in opposite directions, a cylinder mounted above and between said crank shafts, a piston reciprocatingly mounted in said cylinder, a V-shaped guide body, means for attaching the intermediate portion of said V-shaped guide body to said piston, and crank pin blocks carried by said crank shafts and slidably mounted on said V-shaped guide member.

5. A mechanical movement for transforming reciprocatory motion into rotary motion, comprising a pair of parallel crank shafts adapted to rotate in opposite directions, a reciprocating member mounted for movement in a direction perpendicular to a plane passing through said crank shafts, a V-shaped guide body reciprocable with said reciprocating member, and blocks slidably mounted on the arms of said V-shaped guide body and connected to the crank pins of said crank shafts.

6. A mechanical movement for transforming reciprocatory motion into rotary motion, comprising a pair of parallel crank shafts adapted to rotate in opposite directions, a cylinder mounted above and between said crank shafts, a piston reciprocatingly mounted in said cylinder, a V-shaped guide body, lost motion means for attaching the intermediate portion of said V-shaped guide body to said piston, and crank pin blocks carried by said crank shafts and slidably mounted on said V-shaped guide member.

7. A mechanical movement for transforming reciprocatory motion into rotary motion, comprising a pair of parallel crank shafts adapted to rotate in opposite directions, a reciprocating member mounted for movement in a direction perpendicular to a plane passing through said crank shafts, a V-shaped guide body, means connecting said guide body to said reciprocable member to provide limited relative sliding therebetween in a direction transverse to the path of reciprocation, and blocks slidably mounted on the arms of said V-shaped guide body and connected to the crank pins of said crank shafts.

JACQUES FRANÇOIS FELIES.